United States Patent Office 3,497,348
Patented Feb. 24, 1970

3,497,348
SPONGE IRON PRODUCTION
Hans Rausch, Oberursel, Taunus, Günter Heitmann, Frankfurt am Main-Niederrad, and Kurt Meyer and Wilhelm Thumm, Frankfurt am Main, Germany, assignors to Metallgesellschaft Aktiengesellschaft, Frankfurt am Main, Germany, a corporation of Germany
No Drawing. Filed June 7, 1966, Ser. No. 555,699
Claims priority, application Germany, June 25, 1965, M 65,712
The portion of the term of the patent subsequent to Feb. 18, 1986, has been disclaimed
Int. Cl. C21b *13/14*
U.S. Cl. 75—33                                11 Claims

ABSTRACT OF THE DISCLOSURE

Process for the production of sponge iron which comprises admixing sponge iron and iron oxide, forming green pellets of said mixture, and directly reducing such green pellets to iron in a shaft kiln.

---

This invention relates to the production of sponge iron. It more particularly refers to improvements in the production of sponge iron, whereby a product having more desirable physical properties is obtained.

Lump iron ore is becoming increasingly scarce in many parts of the world. In order to augment iron and steel production in these areas, a process has been developed, whereby concentrated iron ore or hard-fired oxidic pellets of iron are subjected to relatively high temperature reducing conditions, whereby sponge iron is produced by the reduction of iron oxides to metallic iron. Generally speaking, this reduction process utilizes iron-containing feed stock which has been especially prepared for this use. The iron-containing raw material is pelletized by means of rolling on a pelletizing plate or a granulating drum into moist "green" pellets. These green pellets are then hard-fired to dimensionally stabilize them and to remove water therefrom, whereby relatively porous pellets suitable for reduction are produced which, under reducing conditions, do not substantially lose their porosity.

The reducing agent for this type of process is generally prepared by the splitting of hydrocarbons to produce mixtures of carbon monoxide and hydrogen. It is also possible, although economically less desirable, to use pure hydrogen or hydrogen diluted with inert or other reducing substances as the reducing agent in processes of this type. The hydrocarbon splitting may be accomplished through the use of air, oxygen, steam, carbon dioxide and/or other similar oxidizing agents with or without the presence of catalysts as known in the art.

The process operates by charging the iron-containing pellets to a reducing reactor, which may be a vertical cylinder, and pass the reducing agent through the pellets at elevated temperatures in the range of about 1000° C. The exhaust gases from the process contain a great deal of sensible heat which may be used to provide heat to the hydrocarbon splitting operation and/or for other operations by means of suitable heat exchangers. It has even been suggested to use the heat exchangers themselves as the reactors in which hydrocarbons are split into an appropriate reducing agent. In this use, these heat exchangers may, in some cases, contain appropriate catalyst.

There are other uses for these exhaust gases. They may be cooled sufficiently to condense the water therefrom, e.g., to about 35° C., whereupon part of the remaining gas may be fed to the hydrocarbon splitter, wherefrom additional reducing material is derived. Another use for such cooled exhaust gas is as a coolant or quench for the reduced product sponge iron in order to insure that the iron exiting the reducing kiln is below about 300° C. so as to prevent substantial reoxidation thereof.

It is apparent that the production of metallic iron from iron oxides involves three distinct operations as such process is practiced in the prior art: production of a suitable reducing material; production of suitably shaped pellets of iron oxides; and reduction of such suitably shaped pellets by said suitable reducing material. While these three operations can be carried out independently and without regard for each other, it is preferred, for economic reasons, to utilize an integrated process where as much efficiency in heat utilization is obtained as possible.

It would be desirable to improve this process by simplifying wherever possible.

It is therefore an object of this invention to provide an improved process for the reduction of iron oxides.

It is another object of this invention to provide a process for producing sponge iron from iron oxide utilizing less capital equipment than the processes of the prior art.

It is a further object of this invention to provide a process of producing sponge iron wherein the product has improved physical properties over similar products available in the past.

It is still another object of this invention to provide sponge iron having improved physical properties.

Other and additional objects will become apparent from a consideration of this entire specification, including the claims appended hereto.

In accord with and fulfilling these objects, this invention comprises, in one of its aspects, the production of metallic sponge iron directly from "green" pellets of iron oxide without the necessity of pre-hardening and firing such green material.

In the process of this invention, green pellets of iron oxides are produced in the usual manner except that they have admixed with said oxides a small amount of metallic iron, preferably in fine particle size. The pellets thus produced need not be fired or pre-hardened or even dried, but may be charged directly to a reducing kiln, wherein they are reduced to sponge iron by a reducing material in a manner similar to that shown in the prior art.

In the practice of this invention, it is preferred to operate the reducing kiln in counter-current flow manner; that is, the reducing material is fed to the kiln at the end there of from which the product sponge iron is removed, while the exhaust gas exits the kiln at the end thereof where the green pellets are charged. An added improvement in the practice of this invention is to provide greater heat at that end of the reducing kiln wherein the green pellets are fed. One method of producing this increased amount of heat is to ignite and burn the exhaust gas before it exits the kiln, thereby transferring the latent heat thereof into the green pellets entering the kiln. Since the exhaust gas is a reducing material, it is generally necessary to provide oxygen either pure or in the form of air, etc., to the exhaust gas, in order to induce it to burn. Thus, the green pellets fed are hardened inside the kiln and also dried therein such that they maintain their dimensional stability and porosity during further processing and reducing in the kiln.

In some instances, particularly where the green pellets of iron oxides contain an inordinate amount of water, it may be desirable to dry the pellets to a greater or lesser extent prior to feeding them to the reducing kiln. This may be accomplished by permitting excess water to evaporate or by heating or centrifuging or other similar water removal processes.

The iron added to the iron oxides in the manufacture of the green pellets is suitably finely divided and also suitably has a very high uncombined iron content. It has been found to be quite desirable to utilize the "fines" produced in this process as the iron admixed with the iron oxides. These fines are produced by the abrading action of the pellets in the reducing kiln with respect to each other and also with respect to the walls of the kiln. Iron can suitably be added admixed with iron oxides in proportion of about 2 to 30 weight percent, based upon the total of iron oxides. It is preferred to provide about 10 to 20 weight percent iron. It is considered that the exact proportion of iron is not determinative of the operability of this invention. A greater or lesser proportion than that specified herein may be used if desired.

It is within the spirit and scope of this invention to provide conventional binder materials in admixture with the iron and the iron oxides. These are an optional constituent and may or may not be used as desired. These materials are exemplified by lime and bentonite, as well as other clays and similar materials. These materials may be present in the proportion of their conventional prior art use. Thus, up to about one weight percent or more binder may be employed in the practice of this invention if desired.

The following examples are given by way of illustration of this invention without in any way being limiting upon the scope thereof.

In the following examples magnetite was used as the ore source of the iron.

EXAMPLES I AND Ia

Green pellets, about 10 to 12 millimeters in diameter, were prepared from a concentrate of naturally occurring magnetite, having an iron content of 68 weight percent, and 0.7 weight percent bentonite binder.

A portion of these pellets were initially fired to 1350° C. to harden and dry them. In the firing, some of the $Fe_3O_4$ content of the pellets was oxidized to $Fe_2O_3$; (the fired pellets constitute Example Ia).

EXAMPLE II

Green pellets about 10 to 12 millimeters in diameter were prepared from a concentrate of naturally occurring magnetite, having an iron content of about 68 weight percent, 15 weight percent finely ground sponge iron, and 0.5 weight percent bentonite binder.

Each of the three kinds of pellets was subjected to reduction in a kiln under identical conditions. The reducing material was a mixture of 67 percent hydrogen and 33 percent nitrogen. The kiln operated at 1050° C. The quantity of pellets from each example charged to the respective kilns was such that each charge contained 310 to 320 grams of iron in oxide form. Because of the added metallic iron used in the pellets of Example II, the total iron content of these pellets was higher, however, this excess was accounted for in the product by subtraction in calculating and measuring metallic iron yields.

The reduction was carried out in a cylindrical kiln, having its axis in the vertical position, and heated electrically charging the pellets and passing nitrogen therethrough while increasing the kiln temperature to 900° C. The gas was then changed to 33 percent nitrogen-67 percent hydrogen, by volume, and the temperature increased to 1050° C. within 30 minutes. This temperature was maintained for as long as the pellets were undergoing reduction, as indicated by a weight loss in the pellets, whereupon heating was disconnected and the reducing gas replaced by pure nitrogen until the pellets had cooled to about 50° C. The product pellets were then tested for their iron content. This is reported as the ratio of metallic iron to the total iron content, taking into account the metallic iron added in Example II.

The following table shows data taken from the above examples as well as from tests run on the product sponge iron.

TABLE.—CONDITIONS AND RESULTS OF REDUCING TESTS

| Run No | 1 | 2 | 3 |
|---|---|---|---|
| Kind of pellets | Green pellets containing 0.7% bentonite. | Fired pellets containing 0.7% bentonite. | Green pellets containing 0.7% bentonite and 15% sponge iron. |
| Reducing gas | 67% $H_2$+33% $N_2$ | 67% $H_2$+33% $N_2$ | 67% $H_2$+33% $N_2$. |
| Temperature | 1,050° C | 1,050° C | 1,050° C. |
| Holding time | 130 minutes | 110 minutes | 110 minutes. |
| Strength of reduced pellets. | 32 kg | 60 kg | 132 kg. |
| Degree of metallization. | 93.9% | 96.8% | 98.3%. |

The results represented in this table conclusively show that the sponge iron produced by the process of this invention is superior to that produced by prior-art techniques and is far superior to that produced from green pellets not obtained according to this invention.

What is claimed is:

1. Process of producing a product which is substantially metallic iron from a raw material which is substantially iron oxide, which comprises mixing said iron oxide raw material with about 2 to 30 wt. percent, based upon total weight of the mixture finely divided metallic iron, pelletizing said mixture to produce pellets and directly feeding said pellets to a direct reduction thereof in a shaft kiln and directly reducing said pellets therein to substantially convert said iron oxide to metallic iron.

2. Process claimed in claim 1, wherein said direct reduction is accomplished by subjecting said pellets to heating sufficient to produce an elevated temperature in said pellets, in the presence of a reducing material.

3. Process claimed in claim 2, wherein said reducing material comprises hydrogen gas.

4. Process claimed in claim 2 wherein said reducing material is the product of oxidative splitting of hydrocarbons.

5. Process claimed in claim 2 carried out continuously, wherein said pellets and said reducing material flow counter-current to each other.

6. Process claimed in claim 5, wherein said reducing material is ignitable and is ignited adjacent to the entry of said pellets into said process.

7. Process claimed in claim 2, wherein said reducing material is ignited, wherein at least a portion of the gaseous product of ignition of said material is recovered and is fed to a hydrocarbon splitting process, and wherein the product of said hydrocarbon splitting process is fed as at least a portion of said reducing material.

8. Process claimed in claim 1, wherein the proportion of metallic iron is about 10 to 20%.

9. Process claimed in claim 1, wherein said iron is sponge iron, and wherein said sponge iron is recycled from the product of the direct reduction thereof.

10. Process claimed in claim 1, wherein said pellets include a binder therein.

11. Process claimed in claim 10, wherein said binder is at least one member selected from the group consisting of lime and bentonite.

References Cited

UNITED STATES PATENTS

| | | | |
|---|---|---|---|
| 1,871,848 | 8/1932 | Gustafsson | 75—38 X |
| 2,523,138 | 9/1950 | Oppegaard | 75—36 X |
| 2,577,730 | 12/1951 | Benedict et al. | 75—35 |
| 2,807,536 | 9/1957 | O'Malley | 75—38 |
| 2,986,460 | 5/1961 | Babcock et al. | 75—38 X |
| 3,072,474 | 1/1963 | Atkinson et al. | 75—38 X |
| 3,205,066 | 9/1965 | Robson et al. | 75—26 |
| 2,865,732 | 12/1958 | Jensen | 75—11 |
| 2,996,373 | 8/1961 | Agarwal | 75—26 |
| 3,053,648 | 9/1962 | Stephens et al. | 75—26 |
| 3,131,052 | 4/1964 | Peras | 75—34 |
| 3,273,993 | 9/1966 | Melcher | 75—1 |

HENRY W. TARRING II, Primary Examiner

U.S. Cl. X.R.

75—34

PO-1050
(5/69)

UNITED STATES PATENT OFFICE
CERTIFICATE OF CORRECTION

Patent No. 3,497,348　　　　Dated Feb. 24, 1970

Inventor(s) HANS RAUSCH, GÜNTER HEITMANN, KURT MEYER and WILHELM THUMM

It is certified that error appears in the above-identified patent and that said Letters Patent are hereby corrected as shown below:

Column 4, line 13, "disconnected" should be --discontinued--; column 4, in the Table under the heading "3", first item, "Green pellets containing 0.7%" should be --Green pellets containing 0.5%--

SIGNED AND
SEALED
JUL 21 1970

(SEAL)
Attest:

Edward M. Fletcher, Jr.
Attesting Officer

WILLIAM E. SCHUYLER, JR.
Commissioner of Patents